3,438,948
AMINO ACID COPOLYMERS
Edward W. Pietrusza, Morristown, Jack R. Pedersen, Parsippany, and Rudolph Pinter, Morristown, N.J., assignors to Allied Chemical Corporation, New York, N.Y., a corporation of New York
No Drawing. Filed Sept. 16, 1965, Ser. No. 487,900
Int. Cl. C08g 20/04
U.S. Cl. 260—78
8 Claims

ABSTRACT OF THE DISCLOSURE

Novel processable copolymers prepared by condensation polymerization of a mixture containing at least 35 mol percent of benzylamine-3-carboxylic acid or an acyl derivative thereof and at least 18 mol percent of benzylamine-4-carboxylic acid or an acyl derivative thereof. The copolymers are stable in the melt and form films and fibers which are resistant to elevated temperatures.

---

This invention relates to novel copolymers of aromatic amino acids and to a process for their preparation. More particularly this invention relates to copolymers of benzylamine-3-carboxylic acid or acylated derivatives thereof with benzylamine-4-carboxylic acid or acylated derivatives thereof.

Polyamides prepared from aromatic amino acids are generally crystalline materials which are resistant to high temperatures. However, such polymers have been of limited utility because of their high melting points, usually well over 300° C., which exceed the operating temperatures of conventional fabricating equipment, and the fact that most of these polymers decompose at or near their melting points. Typical aromatic polyamides are the homopolymer of benzylamine-3-carboxylic acid, which melts at about 340° C. with decomposition, and the homopolymer of benzylamine-4-carboxylic acid, which melts at about 370° C. with decomposition.

It is, therefore, an object of the present invention to provide useful polymers from aromatic amino acids.

Another object of this invention is to provide aromatic polyamides which melt at less than 300° C. to form stable melts which can be readily shaped by conventional means such as molding and extrusion.

Additional objects and advantages of this invention will be apparent from the following detailed description thereof.

In accordance with the present invention, novel aromatic polyamides are prepared by the copolymerization of benzylamine-3-carboxylic acid or the N-acyl derivatives thereof with benzylamine-4-carboxylic acid or the N-acyl derivatives thereof. The proportion of monomers employed are such that the copolymer product contains at least 35 mol percent of the benzylamine-3-carboxylic acid or acyl derivatives thereof and at least 18 mol percent of benzylamine-4-carboxylic acid or acyl derivatives thereof. The copolymers thus produced are amorphous, glassy polymers having melting points of about 200° to 296° C. Preferred compositions contain a minimum of 40 mol percent of benzylamine-3-carboxylic acid or acyl derivative thereof and a minimum of 20 mol percent of the benzylamine-4-carboxylic acid or acyl derivative thereof and melt within the range of about 200° to 270° C. The copolymers of this invention have excellent thermal stability and can be maintained in the melt at temperatures up to 300° C. for several hours without degrading. As a result, the copolymers can be readily formed into shaped articles such as fibers and films by molding and extrusion.

The copolymers of the present invention can be prepared by heating a mixture of the required monomers under an inert atmosphere to a temperature between 200° C. and the decomposition temperature of the copolymer. Preferably the polymerization is carried out at 2 temperature between the melting point of the polymer and 300° C. When all of the monomers employed are amino acids, i.e., a mixture consisting of benzylamine-3-carboxylic acid and benzylamine-4-carboxylic acid in a mol ratio of about 35:65 to 82:18, a condensation-type reaction occurs whereby water is split off and a polymer is formed containing the units:

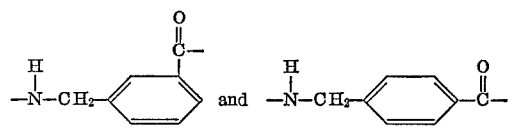

The polymer chain thus produced is terminated at one end by an amino group and at the other end by a carboxyl group.

All or part of the amino acids can be replaced by their N-acylated derivatives. The preferred N-acylated derivatives are represented by the formulas:

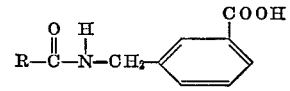

and

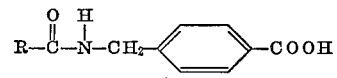

where R is hydrogen or an alkyl group of 1 to 5 carbon atoms. Upon heating the N-acylated compounds, the above-described polymeric units are formed by the splitting off of an acid as illustrated by the following equation in which the acylated compound is N-acetyl benzylamine-3-carboxylic acid:

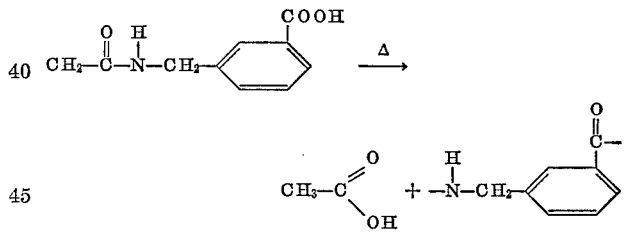

To facilitate the removal of the acid from the reaction mixture, it is advantageous to have a reduced pressure in the system, at least during the latter steps of the polymerization. When an acylated compound is employed, all or part of the polymer chains are terminated at one end with an acyl group instead of an amino group. Such termination is recommended where the copolymer is to be admixed or otherwise contacted with a compound which reacts with an amino group.

The copolymers of this invention can also be modified by replacing the carboxyl terminal groups with a less reactive terminal group. This can be accomplished by adding to the reaction mixture an amino compound such as compounds of the formula $R_1NH_2$, where $R_1$ is a monovalent hydrocarbon group free of aliphatic unsaturation. Such compounds can be added in amounts up to about 10 mol percent of the polymeric reaction mixture. Particularly outstanding results have been obtained by employing benzylamine. The copolymers of the invention can be further described by the following formula:

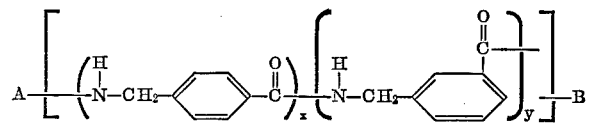

wherein A represents a terminal end group attached to a nitrogen atom and can be hydrogen or a

group wherein R is hydrogen or an alkyl radical of 1 to 5 carbon atoms; B is a terminal end group attached to a carboxyl group and can be hydroxyl or a —$NHR_1$ group wherein $R_1$ is a monovalent hydrocarbon group free of aliphatic unsaturation; and x and y are integers related in a ratio of from about 18:82 to about 65:35. Another method of reducing the number of carboxyl terminal groups present in the copolymer is to react the copolymer with a diamine of the formula $NH_2R_2NH_2$, where $R_2$ is a divalent hydrocarbon group free of aliphatic unsaturation. The amino groups react with the carboxyl groups of two polymer chains linking them together to form a higher molecular weight polymer. The diamine can be employed in an amount up to about 10 mol percent of the copolymer. The reaction can be carried out at a temperature ranging from the melting point of the copolymer to the copolymer decomposition temperature. Preferably, the maximum reaction temperature is about 300° C.

The following examples are given to further illustrate the invention, but it is to be understood that the invention is not limited in any way by the details described therein.

EXAMPLE 1

245 grams of benzylamine-3-carboxylic acid and 105 grams of benzylamine-4-carboxylic acid were mixed and charged to a reaction vessel equipped with stirring means and inlet and outlet tubes for gases. A nitrogen atmosphere was maintained throughout. The vessel was placed in an oil bath equipped with temperature control means at an initial temperature of 120° C. The temperature was increased to 280° C. over a period of 3 hours and held for an additional 1½ hours. The vessel was then allowed to cool to room temperature.

The resultant product was a light yellow, translucent material with a melting point of 236° C. and a reduced viscosity of 0.33 as measured in a 1% solution in concentrated sulfuric acid at 25° C. The copolymer was heated at 280° C. for 3½ hours. The melting point and reduced viscosity were essentially unchanged indicating the good heat stability of the product at temperatures above the melting point.

The experiment was repeated using approximately the same temperature cycle but different proportions of the starting materials. The results are summarized in the table below.

TABLE

| Weight percent | | Melting point, ° C. |
|---|---|---|
| Benzylamine-3-carboxylic acid | Benzylamine-4-carboxylic acid | |
| 100 | 0 | 346 |
| 85 | 15 | 319 |
| 80 | 20 | 236 |
| 75 | 25 | 233 |
| 70 | 30 | 236 |
| 65 | 35 | 231 |
| 55 | 45 | 241 |
| 45 | 55 | 247 |
| 40 | 60 | 270 |
| 0 | 100 | 370 |

The homopolymers of benzylamine-3-carboxylic acid and benzylamine-4-carboxylic acid darken when melted indicating degradation.

EXAMPLE 2

84 grams of N-acetyl benzylamine-3-carboxylic acid and 36 grams of N-acetyl benzylamine-4-carboxylic acid were admixed and charged to a reaction vessel equipped with stirring means and inlet and outlet tubes for gases. The system was flushed with nitrogen and all subsequent reaction conducted in a nitrogen atmosphere.

The reaction vessel was heated to 260° C. and maintained at this temperature for about 4 hours. The vessel was then evacuated to a pressure of about 0.1 mm. of mercury and heated at 260° to 270° C. for about 80 hours. During the reaction, acetic acid was distilled off from the reactants. A copolymer was obtained having a melting point of 220° to 230° C. and a reduced viscosity of 0.45 as measured in a 1% solution in concentrated sulfuric acid at 25° C.

A sample of the polymer was heated at 290° C. for 110 hours under nitrogen with no decomposition. A fiber was drawn from a hot melt of the polymer.

EXAMPLE 3

21 grams of N-formyl benzylamine-3-carboxylic acid and 9 grams of N-formyl benzylamine-4-carboxylic acid were mixed together and charged to a reaction vessel similar to that described in Example 1. The vessel was then placed in an oil bath at 170° C. The monomers melted with the evolution of gas and the temperature was increased to 265° C. After one hour, the pressure was reduced to 0.1 mm. of Hg and the temperature was maintained at 275°–285° C. for 4 hours. The resultant copolymer had a melting point of 220°–235° C. and a reduced viscosity of 0.3 as measured in a 1% solution in metacresol at 25° C.

EXAMPLE 4

In a reaction vessel such as that described in Example 1, there were admixed 10 grams of N-acetyl benzylamine-3-carboxylic acid, 10 grams of N-acetyl benzylamine-4-carboxylic acid, 50 grams of benzylamine-3-carboxylic acid, and 50 grams of benzylamine-4-carboxylic acid. The reaction mixture was heated to 295° C. and maintained at this temperature for 6¾ hours. After 1½ hours, the pressure in the system was reduced from atmospheric to 1 mm. of Hg. During the reaction, water and acetic acid were distilled from the reaction vessel.

A copolymer was obtained having a melting point of 205°–210° C. and a reduced viscosity of 0.25 as measured in a 1% solution in concentrated sulfuric acid at 25° C.

EXAMPLE 5

15 grams of N-acetyl benzylamine-4-carboxylic acid, 35 grams of N-acetyl benzylamine-3-carboxylic acid, and 1 gram benzylamine were admixed in a reaction vessel such as that described in Example 1. The reaction mixture was heated to 260° C. and the resulting acetic acid distillate was collected. After 2 hours the pressure was reduced to 1 mm. of Hg and the reaction was continued for 20 hours at this pressure.

The resultant polymer had a reduced viscosity of 0.33 as measured in a 1% solution in concentrated sulfuric acid at 25° C. and a melting point of 215°–220° C.

Analyses for carboxyl end groups and amine end groups gave very low values, namely 0.037 milliequivalent per gram and 0.017 milliequivalent per gram respectively.

EXAMPLE 6

In a reaction vessel such as described in Example 1, there were admixed 191 grams of N-acetyl benzylamine-3-carboxylic acid and 82 grams of N-acetyl benzylamine-4-carboxylic acid. The reaction mixture was heated to 270° C. and maintained at this temperature for 6 hours; the pressure in the system was rdeuced to 0.1 mm. of Hg after the first 2 hours. 184 grams of polymer were obtained having a reduced viscosity of 0.28 in a 1% solution in concentrated sulfuric acid. Analysis for carboxyl end groups gave 0.2685 milliequivalent per gram.

50 grams of the polymer were admixed with 1.4 grams of m-xylylene diamine under a nitrogen atmosphere. The reaction mixture was heated at 20° C. for 1 hour and 35 minutes under the following pressures:

(1) Atmospheric (N₂) for 60 minutes.
(2) 20 mm. Hg for 45 minutes.
(3) 30 mm. Hg for 30 minutes.
(4) 0.2 mm. Hg for 30 minutes.

A polymer was obtained having a reduced viscosity of 0.60 in a 1% solution in concentrated sulfuric acid. Analysis for carboxyl end groups gave 0.06 milliequivalent per gram.

It will be apparent that many modifications and variations may be effected without departing from the scope of the novel concepts of the present invention, and the illustrative details disclosed are not to be construed as imposing undue limitations on the invention.

We claim:
1. A fusible aromatic copolymer consisting essentially of

(1) 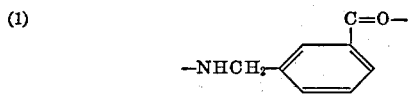

and (2) 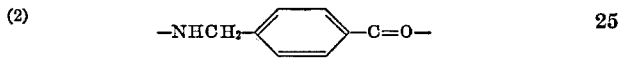

units, said copolymer containing at least 35 mol percent of units identified as (1) and at least 18 mol percent of units identified as (2).

2. A copolymer according to claim 1 wherein at least 40 mol percent of units identified as (1) and at least 20 mol percent of units identified as (2) are present.

3. A fusible aromatic copolymer of the formula

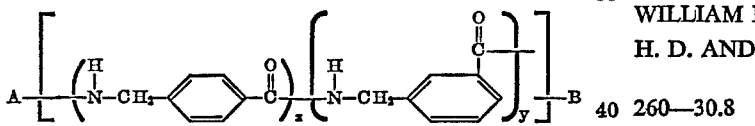

wherein A is a terminal end group attached to a nitrogen atom selected from the group consisting of hydrogen and

wherein R is selected from the group consisting of hydrogen or alkyl radicals of 1 to 5 carbon atoms; B is a terminal end group attached to a carboxyl group selected from the group consisting of hydroxyl and —NHR₁ radicals wherein R₁ is a monovalent hydrocarbon group free of aliphatic unsaturation; and $x$ and $y$ are integers related in a ratio of from about 18:82 to about 65:35.

4. A copolymer according to claim 3 wherein R₁ is phenyl.

5. A copolymer according to claim 3 wherein A is hydrogen and B is hydroxyl.

6. A copolymer according to claim 3 wherein A is an acetyl group.

7. A copolymer according to claim 3 wherein A is a formyl group.

8. A copolymer according to claim 3 wherein A is an acetyl group and B is

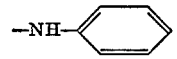

References Cited

UNITED STATES PATENTS

| | | | |
|---|---|---|---|
| 2,071,253 | 2/1937 | Carothers | 260—78 |
| 2,163,636 | 6/1939 | Spanagel | 260—78 |
| 2,245,129 | 6/1941 | Greenewalt | 260—78 |
| 2,688,011 | 8/1954 | Wheatley et al. | 260—78 |

FOREIGN PATENTS 618,244  4/1961  Canada.

WILLIAM H. SHORT, *Primary Examiner.*

H. D. ANDERSON, *Assistant Examiner.*

U.S. Cl. X.R.

260—30.8